United States Patent [19]
Colizza

[11] Patent Number: 5,845,286
[45] Date of Patent: Dec. 1, 1998

[54] DATE VALUE REDUCTION SYSTEM

[76] Inventor: Vincent Colizza, 46 Edgemont Dr., Winnipeg, Manitoba, Canada, R2J 3H9

[21] Appl. No.: 772,887

[22] Filed: Dec. 24, 1996

[51] Int. Cl.⁶ ....................................................... G06F 17/30
[52] U.S. Cl. .................................. 707/101; 707/1; 707/6
[58] Field of Search ..................... 707/101, 1, 6

[56]  References Cited

U.S. PATENT DOCUMENTS

| | | | |
|---|---|---|---|
| 5,600,836 | 2/1997 | Alter | 707/101 |
| 5,644,762 | 7/1997 | Soder | 707/6 |
| 5,668,989 | 9/1997 | Mao | 707/101 |
| 5,737,735 | 4/1998 | Soder | 707/6 |
| 5,740,442 | 4/1998 | Cox et al. | 395/704 |
| 5,758,336 | 5/1998 | Brady | 707/6 |
| 5,761,668 | 6/1998 | Adamchick | 707/101 |
| 5,765,145 | 6/1998 | Masiello | 707/1 |

OTHER PUBLICATIONS

"The Year 2000 and 2–Digit Dates: A Guide for Planning and Implementation", IBM, (Poughkeepsie, New York, 1996), May, 1996, pp. 4–3 to 4–6, May 1996.

*Primary Examiner*—Paul R. Lintz
*Attorney, Agent, or Firm*—Murray E. Thrift; Adrian D. Battison

[57]  ABSTRACT

The year 2000 Problem is addressed by hard coding a Date Translation Object which finds and reduces the two digit year dates by a constant factor of 28 years. After data processing is complete, the Date Reduction Object reintroduces the constant factor into the data values.

3 Claims, 3 Drawing Sheets

DATE VALUE REDUCTION SYSTEM

FIELD OF THE INVENTION

The present invention relates to data processing systems and more particularly to data processing systems that record date data including two-digit year values.

BACKGROUND

In data processing systems that record date data including two-digit year values, there is a significant problem that will arise in the year 2000. This is the result of numeric overflow with a two-digit year value. The application problems can be categorized into the major areas of sorting, calculation, validation and display. The problems are illustrated in the following Table 1 which compares calculation results using the two-digit "yy" date value and a four-digit "ccyy" year value. In sorting, with a two-digit year value, 00 comes before 99 so that sorting in numerical sequence becomes a problem. In calculations, subtracting a pre-2000 year value from a post-1999 year value results in a negative number when using two-digit year values. For validation, dates later than 2000 may be evaluated as having a numerical value less than an earlier date in the preceding century. The two-digit year can produce an ambiguous display where the year is 31 or less.

TABLE 1

|  | Using YY | Using CCYY |
|---|---|---|
| Sorting | 00 | 1999 |
|  | 99 | 2000 |
| Calculations | 96 − 46 = 50 | 1996 − 1946 = 50 |
|  | 00 − 46 = −46 | 2000 − 1946 = 54 |
| Validation | 960101 > 000101 | 19960101 < 20000101 |
| Display | 01/01/01 | 2001/01/01 |

TABLE 1

Current proposals to resolve this problem involve extensive reprogramming of systems and very high cost. The aim of the present invention is to provide a unique and cost effective approach to resolve this problem.

SUMMARY

The present invention is based on the premise that the calendar cycle repeats itself every 28 years. This can be verified by a relatively straightforward analysis:

there are seven days in a week.

a calendar cycle can start on any one of the seven days, resulting in seven different calendars for a normal year.

the same premise applies to leap years, resulting in seven different calendars for leap years.

This results in a total of 14 different possible calendars.

Since a leap year normally occurs every four years, the cycle for possible calendars repeats itself every 28 years.

It should be noted that the years 1800 and 1900 do not follow the cycle because they are exceptions to the rule. They are not leap years. The years 1801 to 1899 cycle through fourteen calendars—seven with leap years and seven without. The years 1901 to 2050 cycle through the same set of calendars, but in a different order. For example, Jan. 1, 1901, 1929, 1957, 1985, 2013 and 2041 all fall on the Tuesday and are not leap years. Given the cyclic nature of the calendar, a date value can be reduced by a factor of 28, or a multiple of 28, and still result in the same calendar cycle (excluding the exceptions noted above).

This gives rise to the date value reduction concept, which involves reducing the two-digit date value by 28 or an integral multiple of 28.

The following Table 2 is like Table 1 above but adds a column showing the use of the date value reduction (DVR) concept.

TABLE 2

|  | Using YY | Using CCYY | Using DVR |
|---|---|---|---|
| Sorting | 00 | 1999 | 71 |
|  | 99 | 2000 | 72 |
| Calculations | 96 − 46 = 50 | 1996 − 1946 = 50 | 68 − 18 = 50 |
|  | 00 − 46 = −46 | 2000 − 1946 = 54 | 72 − 18 = 54 |
| Validation | 960101 > 000101 | 19960101 < 20000101 | 680101 < 720101 |
| Display | 01/01/01 | 2001/01/01 | 72/01/01 |

TABLE 2

As can be seen, the reduced value dates will sort in the correct order. Calculations yield the correct results and validation provides the correct sequencing of dates. Display remains a problem since the displayed year is 28 years earlier than the actual date in question.

With this concept, the actual processing software need not be rewritten as it will operate properly with the reduced date values. However, additional problems do exist with the input and output of data.

The input and output problems are resolved with the use of a "date translation object" which translates an input date into the desired output date. This is a short sub-routine that can handle all possible date translation requests, whether adding the date value or subtracting it. This significantly minimizes the reprogramming of system programs and automatically ensures that the output data supplied to other systems or to users of the system needs no subsequent translation.

Thus, according to one aspect of the present invention there is provided a method of operating a data processing system having:

data processing means for processing data including two-digit year values;

data input means for receiving data from an external source; and data output means for delivering data to an external recipient, said method comprising:

selecting a year reduction value that is a non-zero integral multiple of 28;

subtracting the year reduction value from each year value received by the data input means; and adding the year reduction value to each year value delivered by the data output means.

Where the system includes recorded data the method further includes subtracting the year reduction value from each year value recorded in the data.

According to another aspect of the present invention there is provided, in a data processing system comprising:

data processing means for processing data including two-digit year values;

data input means for receiving data from an external source; and data output means for delivering data to an external recipient, the improvement comprising:

means for subtracting a selected year reduction value from each year value received by the data input means; and means for adding the selected year reduction value to each year value delivered by the data output means.

According to a further aspect of the present invention there is provided an operating system for a data processing apparatus which includes;

processing means for processing data including two-digit year values;

data input means for receiving data from an external source; and data output means for delivering data to an external recipient, the operating system comprising a sequence of instructions including:

input instructions associated with each receipt of data by the data input means;

output instructions associated with each delivery of data by the data output means;

date translation means for selectively subtracting a selected year reduction value from a two-digit year value or adding the selected year reduction value to a two-digit year value;

an input date translation statement associated with each input instruction for causing the date translation means to subtract the year reduction value from each two-digit year value received by the data input means; and an output date translation statement associated with each output instruction for causing the date translation means to add the year reduction value to each two-digit year value delivered from the data output means.

The invention also extends to a method of modifying an existing system. According to this aspect of the present invention there is provided a method modifying an operating system for a data processing apparatus having:

data processing means for processing data including two-digit year values;

data input means for receiving data to be processed; and data output means for delivering processed data, said operating system comprising a set of program statements, including input statements for operating the data input means and output statements for operating the data output means, said method comprising:

providing a date translation sub-routine for selectively adding a selected integer to or subtracting the selected integer from a two-digit year value;

providing an input data translation call statement for actuating the date translation means to subtract said integer from a two-digit year value;

providing an output data translation call statement for actuating the date translation means to add said integer to a two-digit year value;

inserting said input data translation call statement in said set of program statements in association with each input statement; and inserting said output data translation call statement in said set of program statements in association with each output statement.

The call statements are readily added to the system program using a conventional hunting program.

BRIEF DESCRIPTION OF THE DRAWINGS

In the accompanying drawings, which illustrate various aspects of the present invention.

DETAILED DESCRIPTION

Figure 1:
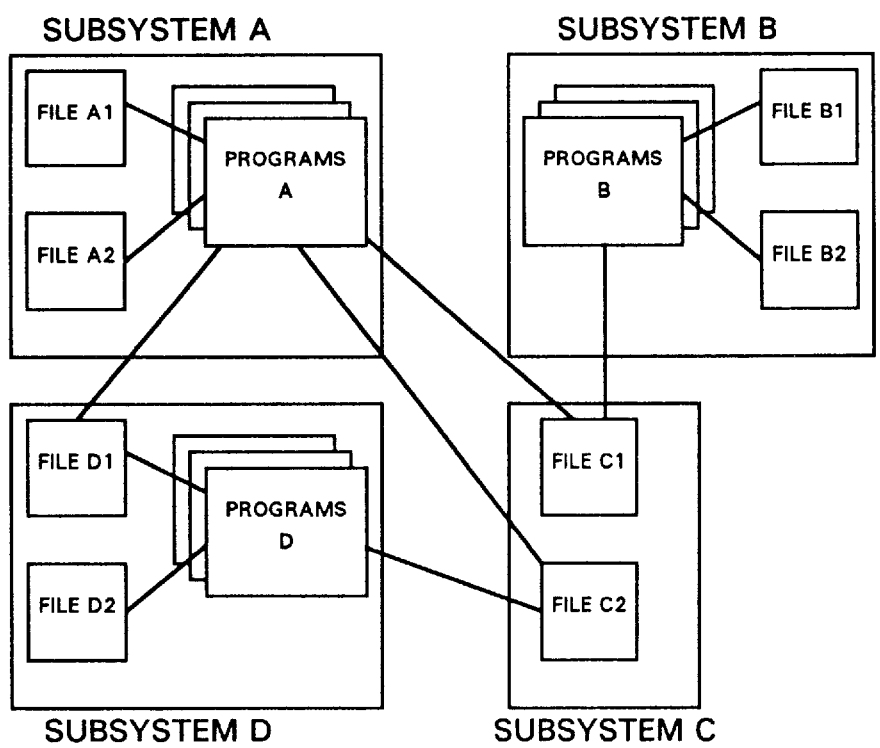
FIG. 1 is a schematic representation of a representative system with several associated sub-systems.

Referring to the accompanying drawings, FIG. 1 illustrates a system 10 incorporating sub-systems A, B, C and D. The system priority is A, B, D and C.

Subsystem A is illustrated as including two files A1 and A2, each recording dates including two-digit year data. The subsystem also includes programs A for processing the data. Similarly, subsystem B includes files B1 and B2 and programs B while subsystem D includes files D1 and D2 and programs D. Subsystem C is illustrated as including only files C1 and C2.

In the illustrated embodiment, programs A access the data recorded in files A1 and A2. They also access data from files C1, C2 and D1. Programs B access data from files B1, B2 and C2. Programs D access data from files D1, D2 and C1.

Figure 2:
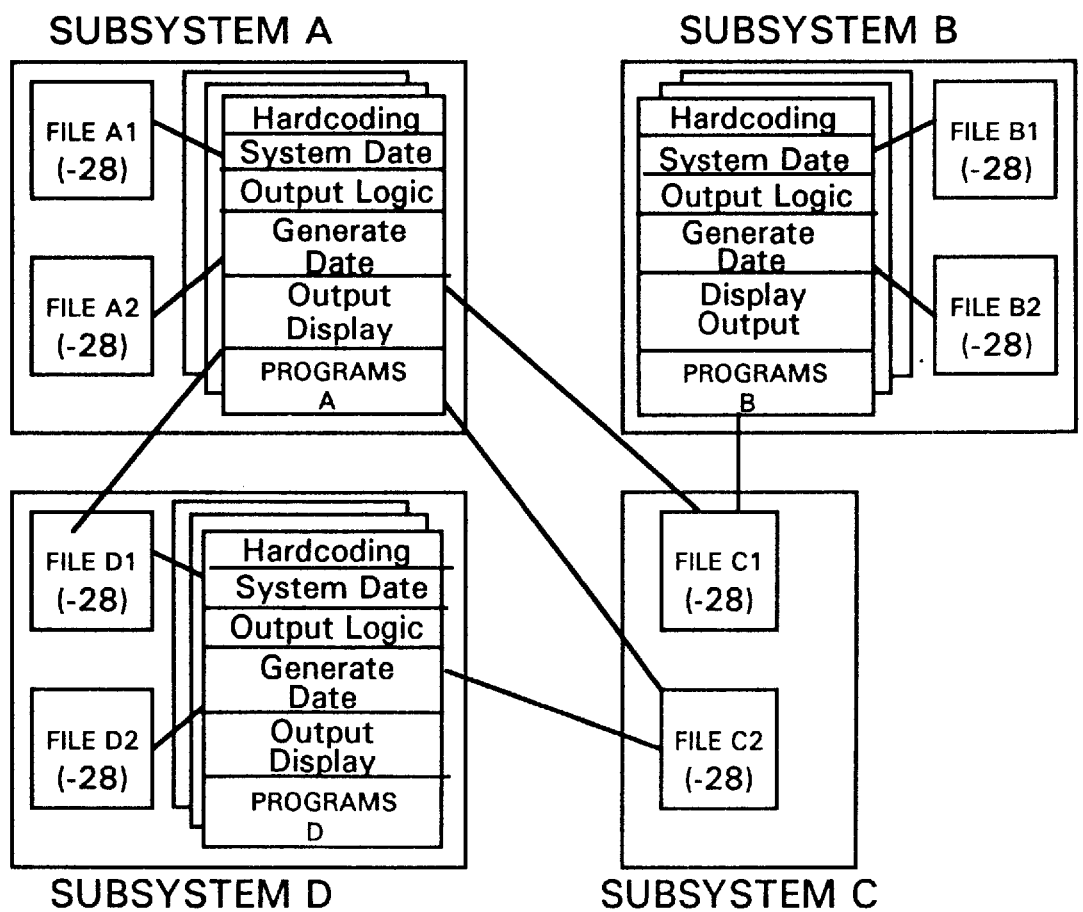
FIG. 2 is a view like FIG. 1 illustrating modifications that must be made to the system in order to use the date value reduction method without a date translation object.

To implement the date value reduction method fully without the date translation object, several modifications to the system are required. As Illustrated in FIG. 2, these include subtracting the date value from each recorded two-digit year value, changing hard coded values, providing special logic for system date access and for preparing dates for output. Display changes are also required. Logic is required to generate an eight-digit date. File layout changes are also required.

All of the modifications included in the implementation illustrated in FIG. 2 are not required in all implementations. For example, the conversion to an eight-digit date may be omitted. In this case, it may be desirable to provide logic and display changes so that the dates may be displayed in a manner that distinguishes clearly amongst the day, month and year. Even this can be omitted where a six-digit date is adequate for display. Even the simplest embodiment of this implementation requires special logic to output the increased six-digit date.

Figure 3:
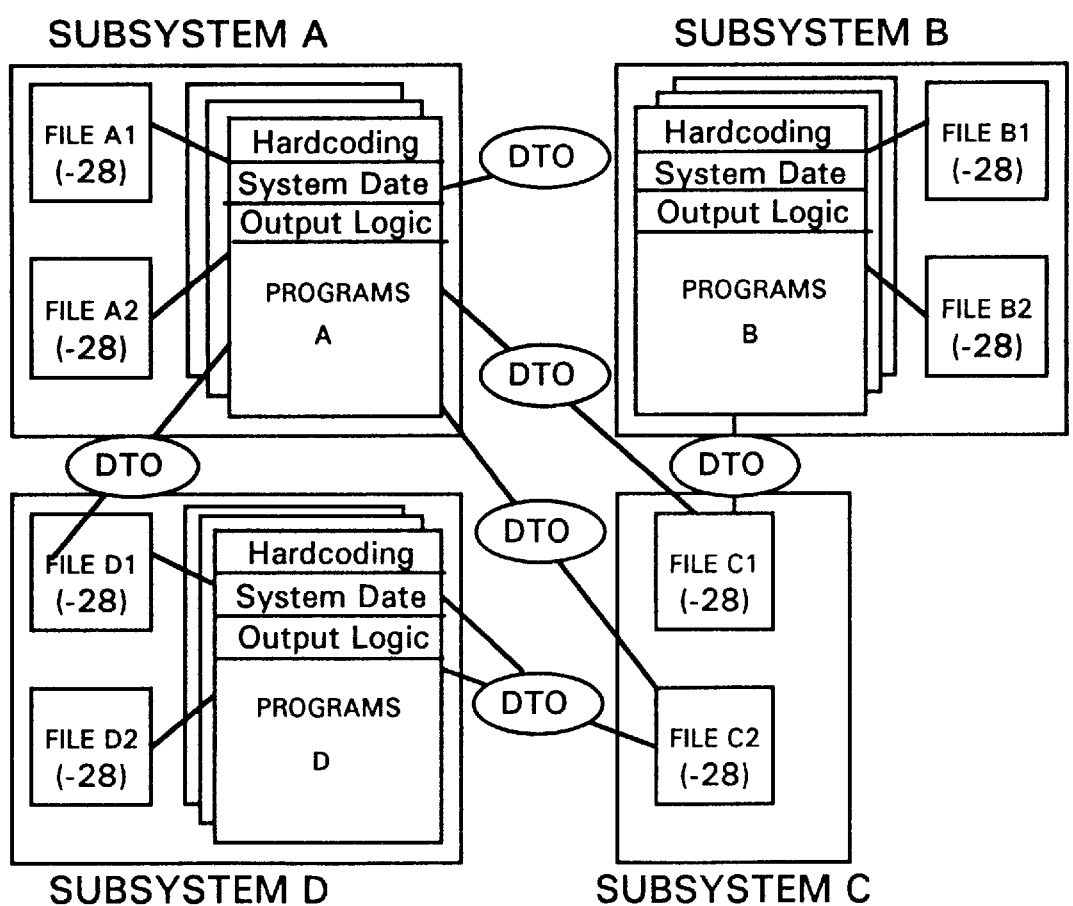
FIG. 3 is a view like FIG. 1 illustrating the modifications made to the system to use the date value reduction method with the date translation object.

The implementation of the date value reduction technique using the date translation object is illustrated in FIG. 3. Within each system, the two-digit year value is reduced by 28. This can be accomplished with a relatively straightforward find-and-replace algorithm. Hard coded values are also changed. A date translation object is added to the system and a call to the date translation object is installed in the subsystem programs with every call to an external data file and every call to an output. A call to the date translation object is also installed in association with each call to the system date, so that the system date may be left unaltered. Installation of these calls is a relatively straightforward matter using a conventional hunter package.

As can be seen, with relatively little effort, a sub-system or system can be modified to avoid the year 2000 problem using the date value reduction and date translation object solution. Installation is relatively straightforward. The date translation object can be installed without altering the data, with the year reduction value set to 0. The system should then operate in a completely normal way with the date translation object being invisible. The year values in the data can then be reduced and the year reduction value entered in the date translation object.

While a particular embodiment of the present invention has been described in the foregoing, it is to be understood that other embodiments are possible within the scope of the invention and are intended to be included herein. The invention is to be considered limited solely by the scope of the appended claims.

I claim:

1. A method of operating a data processing system having:

data processing means for processing data including two-digit year values;

data input means for receiving data from an external source; and data output means for delivering data to an external recipient, said method comprising:

selecting a year reduction value that is a non-zero integral multiple of 28;

delivering individual two-digit year values from the external source to the data input means converting each two digit year value received by the data input means to a reduced year value by subtracting the year reduction value from each said year value received by the data input means;

delivering the reduced year values directly from the data input means to the data processing means:

processing data including the reduced year values;

delivering processed data including reduced year values directly from the data processing means to the data output means;

adding the year reduction value to each year value delivered by the data output means to an external recipient.

2. In a data processing system comprising;

data processing means for processing data including two-digit year values;

data input means for transmitting data from an external source to the data processing means;

data output means for delivering data from the data processing means to an external recipient;

an input date translation object associated with the data input means for converting to a reduced year value each two digit year value transmitted by the data input means from the external source to the data processing means by subtracting a selected year reduction value from each said year value as the year value is transmitted; and an output date translation object associated with the data output means for converting each reduced vear value each two digit vear value delivered by the data input means from the data processing means to the external recipient by adding the selected year reduction value to each said year value as the year value is delivered to the external recipient.

3. A data processing system according to claim 2, which includes;

an operating system comprising a sequence of instructions including:

input instructions associated with each transmission of data by the data input means;

output instructions associated with each delivery of data by the data output means;

an input date translation statement associated with each input instruction for causing the input date translation object to subtract the year reduction value from each two-digit year value transmitted by the data input means; and an output date translation statement associated with each output instruction for causing the output date translation object to add the year reduction value to each two-digit year value delivered from the data output means.

* * * * *